(12) United States Patent
Gush et al.

(10) Patent No.: US 9,555,387 B2
(45) Date of Patent: Jan. 31, 2017

(54) METHOD FOR MANUFACTURING ENCAPSULATED SUPERHARD MATERIAL

(75) Inventors: Keith Gush, Wales (IE); Mark Gregory Munday, County Clare (IE); Peter Schmock, Essen (DE); Stephen Kelly, County Clare (IE)

(73) Assignee: ELEMENT SIX LIMITED, County Clare (IE)

( * ) Notice: Subject to any disclaimer, the term of this patent is extended or adjusted under 35 U.S.C. 154(b) by 279 days.

(21) Appl. No.: 13/028,095

(22) Filed: Feb. 15, 2011

(65) Prior Publication Data

US 2012/0009345 A1 Jan. 12, 2012

Related U.S. Application Data

(63) Continuation of application No. 12/747,044, filed as application No. PCT/IB2009/050626 on Feb. 16, 2009, now abandoned.

(30) Foreign Application Priority Data

Feb. 14, 2008 (ZA) .................................. 2008/01525

(51) Int. Cl.
*B01J 13/04* (2006.01)

(52) U.S. Cl.
CPC .................................... *B01J 13/043* (2013.01)

(58) Field of Classification Search
CPC .................................................. B01J 13/043
USPC ........................................................... 427/216
See application file for complete search history.

(56) References Cited

U.S. PATENT DOCUMENTS

| | | | |
|---|---|---|---|
| 3,377,146 A | 4/1968 | Von Stroh | |
| 4,770,907 A * | 9/1988 | Kimura | 427/217 |
| 5,143,523 A | 9/1992 | Matarrese | |
| 5,405,573 A | 4/1995 | Clark et al. | |
| 6,354,728 B1 | 3/2002 | Bretschneider et al. | |
| 6,449,869 B1 | 9/2002 | Bretschneider et al. | |
| 2002/0194955 A1 * | 12/2002 | Fang et al. | 75/240 |
| 2005/0129975 A1 | 6/2005 | Ihara | |
| 2006/0211342 A1 * | 9/2006 | Bonner et al. | 451/49 |

FOREIGN PATENT DOCUMENTS

| | | |
|---|---|---|
| DE | 197 50 042 A | 12/1998 |
| EP | 0 012 631 A | 6/1980 |
| GB | 1014295 * | 12/1965 |
| JP | 59-73036 A | 4/1984 |
| JP | 5-202353 A | 8/1993 |
| JP | 6-136561 A | 4/1994 |
| JP | 7-047261 A | 2/1995 |
| JP | 8-337498 A | 12/1996 |
| JP | 9-25107 A | 1/1997 |
| JP | 10-110116 A | 4/1998 |
| JP | 2000-153145 A | 6/2000 |
| JP | 2002-526738 A | 8/2002 |
| JP | 2003-171652 A | 6/2003 |
| JP | 2004-511617 A | 4/2004 |
| JP | 2004-513986 A | 5/2004 |
| JP | 2005-120368 A | 5/2005 |
| JP | 2005-522337 A | 7/2005 |
| JP | 2006-509803 A | 3/2006 |
| JP | 2010-534131 A | 11/2010 |
| WO | WO 00/16887 A | 3/2000 |
| WO | WO 02/31078 A | 4/2002 |
| WO | WO 02/38264 A | 5/2002 |
| WO | WO 03/086702 A | 10/2003 |
| WO | WO 2004/052607 A | 6/2004 |
| WO | WO 2006/032982 A | 3/2006 |
| WO | WO 2009/013715 A | 1/2009 |
| WO | WO 2009/013717 A | 1/2009 |
| WO | WO 2009/013717 A2 | 1/2009 |
| ZA | 2007/06074 | 7/2007 |

OTHER PUBLICATIONS

Office action issued by Japanese Patent Office for corresponding Japanese Patent Application 2010-546436 dated Apr. 2, 2013 with English translation.
Office action issued by European Patent Office for corresponding European Patent Application 09710630-1355 dated Jan. 17, 2014.
Office action issued by Korean Patent Office (KIPO) for corresponding Korean Patent Application 2010-7020406 dated Mar. 17, 2015.

\* cited by examiner

*Primary Examiner* — Tabatha Penny
(74) *Attorney, Agent, or Firm* — Frommer Lawrence & Haug LLP

(57) ABSTRACT

A process for the formation of pellets containing an ultra hard (superhard) core coated with an encapsulating material includes utilizing a shovel rotor in combination with a rotating pan and/or a fluidized bed apparatus in sequence. The process includes providing a source of superhard material, providing a mixture comprising a binder, a solvent or fluid medium and the intended coating or encapsulating layer, and combining the superhard material and the mixture in a shovel rotor. The rotor of the shovel rotor is rotated at a velocity such that the superhard material is encapsulated by the mixture to form pellets. The pellets are introduced into a rotating vessel or fluidized bed granulating apparatus, and the pellets are contacted with encapsulating material to form pellets of greater mass than the pellets introduced into the vessel.

11 Claims, No Drawings

METHOD FOR MANUFACTURING ENCAPSULATED SUPERHARD MATERIAL

CROSS REFERENCE TO RELATED APPLICATIONS

This application is a continuation of U.S. patent application Ser. No. 12/747,044 entitled "Method for Manufacturing Encapsulated Superhard Material" which is a 371 of PCT/IB2009/050626 filed on Feb. 16, 2009, published on Aug. 20, 2009 under publication number WO 2009/101605 A and claims priority benefits of South African Patent Application No. 2008/01525 filed Feb. 14, 2008, the disclosure of all are incorporated herein by reference

INTRODUCTION

This invention relates to a method for manufacturing encapsulated ultra hard (superhard) (abrasive) material. In particular, this invention relates to a method for manufacturing superhard material selected from diamond and cBN, the method including the step of using a shovel rotor in combination with a second technique.

BACKGROUND TO THE INVENTION

U.S. Pat. No. 4,770,907 (Kimura, Fuji Paudal, 1988), U.S. Pat. No. 5,143,523 (Matarrese, GE, 1992) and U.S. Pat. No. 5,405,573 (Clark et al., GE, 1995) all describe the use of fluidised beds to coat particles. In this method, ultra hard cores, e.g. diamond seeds, are suspended in a flow of gas within a chamber, into which a fine suspension of binder, solvent and particulate material (e.g. metal powder, the encapsulating material) is sprayed. Alternatively, the binder-solvent may be sprayed with separate powder addition. The emergent pellets are built up in volume proportional (non-linearly) to the residence time spent in the chamber. The advantage of this process is that the fluid bed allows a good separation of the core seeds and thereby ensures that a single core (diamond seed) is contained in each pellet while depositing coating material at a reasonable rate. The disadvantage of this technique is that the maximum deposition rate is relatively slow and when using a high density particulate coating material e.g. Mb, W and WC, and the increasing mass of the pellets presents difficulties in terms of the capabilities of the equipment to maintain the suspension. This can be addressed by increasing the capacity of the equipment but this is costly and impacts on the commercial viability of producing commercial volumes of material. In addition, fluid-bed type coatings are not ideal when coating with a mix of powders of different densities and particle shapes and sizes as the material has a tendency to segregate in the fluid bed and the intended composition may not be uniformly achieved.

The "rotating pan" method as described in GB1014295 (Norton, 1965) and EP0012631 (Tomlinson, DeBeers, 1983) involves introducing the ultra hard core material, e.g. diamond seeds, into either a rotating inclined pan, a drum or any other rotating vessel, where the pellet can be built up by 1) spraying a slurry containing metal powder, binder and solvent (encapsulating material) over the rotating diamond seeds and/or 2) the binder and solvent is/are sprayed separately and the metal powder then "sprinkled" over the rotating diamond seeds. Rotation of the pan separates the coated diamond seeds (emergent pellets) and allows time for removal of the solvent from the sprayed material to form a concentric jacket of encapsulating material which increases in volume as the process proceeds. This technique is efficient in terms of depositing encapsulating material and thus building up the pellet mass quickly. However, the difficulty with this method is that it is susceptible to agglomeration of the cores and/or early pellets in the initial stages of the process. Deposition rates must be very slow to avoid agglomeration and this increases the overall processing time and reduces the throughput of the process. Agglomeration reduces in severity after the emergent pellet has attained a critical size. The consequence of the agglomeration is that the final pellets may have significant size distribution and may contain more than one core per pellet. This contributes to increased process time and cost.

ZA2006/06674 (Flynn et al., E6, 2006) partly over come this problem by adopting a dual stage process for the rapid formation of pellets. Essentially the solution to the problems described above is to combine the two techniques known in the art into a single process design. As such, the initial stages of the process involve a fluid bed approach to maximise the yield of pellets containing one core particle only e.g. diamond seeds. The pellets may be built up to a critical size volume (Vcrit) whilst remaining in a fluid suspension. When the pellets attain this critical size, the pellets are transferred to a rotating pan where the pellets form the (sub) core of the final pellet process. The pellets so produced have a volume significantly greater than the pellets as introduced and the risk of agglomeration is much reduced as the layer on the surface absorbs the spray more quickly and thus deposition rates may be increased. In addition, the weightier particles are less likely to be held together by surface tension of the spray. However, combining both techniques requires two sets of capital equipment and downtime in terms of transferring material from one machine to the other.

Therefore, there is a need to develop a technique which would overcome the technical difficulties outlined above and provide a more cost efficient solution to producing encapsulated abrasives. Preferably such a technique provides an advantage when used in combination with either 'pan rotating' or 'fluidised' route.

The contents of applicant's South African patent application no. 2007/06077 filed on 23 Jul. 2007 and all applications claiming priority therefrom are herein incorporated by reference.

SUMMARY OF THE INVENTION

According to the present invention there is provided a process for the formation of pellets containing an ultra hard (superhard) core coated with an encapsulating material, the process including the steps of utilising a shovel rotor in combination with a rotating pan and/or a fluidised bed apparatus in sequence.

In a preferred embodiment of the invention the process includes:
  providing a source of superhard material,
  providing a mixture comprising an appropriate binder, a solvent or fluid medium and the intended coating or encapsulating layer,
  combining the superhard material and the mixture in a shovel rotor comprising a vessel including a rotor, the vessel adapted to receive a stream of gas,
  rotating the rotor at an appropriate velocity such that the superhard material is encapsulated by the mixture to form pellets,
  introducing the pellets into a rotating vessel, contacting the pellets with encapsulating material to form pellets of greater mass than the pellets introduced into the rotating vessel.

Preferably the rotating vessel is a pan or a drum.

The shovel rotor equipment is described in DE19750042, U.S. Pat. Nos. 6,449,869 and 6,354,728, the contents of which are incorporated herein by reference.

The superhard material may be selected from diamond, cubic boron nitride, wurtzitic boron nitride, a carbide, oxide or silicide, $Si_3N_4$, SiC, $Al_2O_3$, AlC, $SiO_2$ and/or clusters of any of the above. Most preferably the superhard material is diamond. The diamond may be natural or synthetic. Synthetic diamond may be synthesized by chemical vapour deposition or High Pressure High Temperature (HPHT) techniques.

Preferably the superhard material is present in the form of particles. The superhard particles are preferably at least about 0.01 um, preferably at least about 0.1 um, more preferably at least about 1 um in diameter. The superhard particle is preferably no greater than about 5 mm, preferably no greater than about 4 mm, more preferably no greater than about 3 mm in diameter. Preferably the particle has a size of from about 1 um to about 1.5 mm, measured across the greatest dimension of the particle. In this size range, the particles are known as micron, grit or monocrystal.

The particles may be pre-coated or clad particles and/or the particles may be partly encapsulated particles from an earlier process step using the same or different process technology. The particles (uncoated, coated, clad or encapsulated) may be referred to as seed particles.

Definitions:

Encapsulated Particles

Encapsulated particles, such as abrasive grit, are particles that have been encapsulated within an envelope comprising a mass of particulate materials, such as metal, metal alloy, ceramic and/or cermet powders or combinations thereof, by any process involving the use of a distinct binder to hold the particulate material together. Typically the binder is an organic material. The binder may be subsequently removed and the particulate material can be partially or fully sintered.

Coated/Clad Particles

Coated particles can be described as having a core comprising at least one said particle which is fully or partially surrounded by a layer or layers of material either physically or chemically bonded to the surface of the particle. In this invention the coating differs to encapsulation in that the process for producing the coating does not rely on a binder material holding particulate material together immediately after deposition. The coating may either completely or partially cover the surface of the core particle(s). Processes for producing coatings include: chemical vapour deposition (CVD), physical vapour deposition (PVD), other equivalent hot or cold processes, plating, sol-gel or ceramic coatings produced using polymer pre-cursors. The coating thickness can be anything ranging from a mono-atomic layer up to hundreds of micron, but typically range from 0.1 um to 5 um. In instances where the coating thickness is large relative to the size of the abrasive particle (e.g. where the thickness of the coating is greater than about 5% the diameter of the core particle), then the coating can be further classified as a cladding. In the case of a cladding the preferred methods for deposition include electroless and electrolytic deposition.

Essentially this aspect of the invention is to combine the two techniques of shovel rotor coating, pelletising or encapsulating particles and the rotating pan method into a single process design. As such, the initial stages of the process involve a shovel rotor approach to maximise the yield of pellets containing one core particle only e.g. diamond seeds. The pellets may be built up to a critical size volume (Vcrit) whilst remaining in a suspension. When the pellets attain this critical size, the pellets removed from the shovel rotor and are transferred to a rotating pan where the pellets form the (sub) core of the final pellet process. The pellets so produced have a volume significantly greater than the pellets as introduced and the risk of agglomeration is much reduced.

In the preferred embodiment of the present process, the coating of the material by means of the shovel rotor method is continued for a sufficient time to build the coating on each core to achieve a predetermined critical size (Vcrit). The average diametric dimension of each pellet may range up to, but no greater than, approximately 4, preferably no greater than 3, more preferably no greater than 2 times the average diametric dimension of the ultra hard cores.

An advantage of the shovel rotor is that pellets of different characteristics can be produced, such as weaker pellets and pellets that are less compacted.

The pellets as produced are thereafter introduced into a rotating, preferably inclined pan, where the pellet can be built further up by 1) spraying a slurry containing metal powder, binder and solvent (coating composition) over the rotating diamond seeds and/or 2) the binder and solvent is/are sprayed separately and the metal powder then "sprinkled" over the rotating diamond seeds. Rotation of the pan allows time for removal of the solvent from the sprayed coating material to form a concentric jacket of coating material which increases in volume as the process proceeds.

The process according to the present invention results in significantly increased accretion rate in the pan method over use of the pan method alone. According to the present invention, the diameter of the pellets can increase by up to 50 microns per hour, preferably 100 microns per hour, more preferably 150 microns per hour, more preferably 200 microns per hour, more preferably 250 microns per hour, more preferably 300 microns per hour, more preferably 350 microns per hour, more preferably 400 microns per hour, most preferably 450 microns per hour. This results in a much reduced process time in the pan coater and subsequent reduction in process costs.

This advantage is achieved by ensuring the pellets from the shovel rotor granulator are of sufficient volume (Vcrit) to ensure minimal agglomeration in the rotating pan coater in the initial stages, thereby allowing a faster build up rate.

The pelletised material has a broad range of applications including the pelletising of diamond seeds in the range 200-1500 microns with particulate metal including but not limited to Co, Fe, Ni, W, Mn, Cu and Sn, ceramic, tungsten carbide powders and/or aggregates thereof.

The process according to the present invention provides a significant advantage in terms of cost of production of pellets and enables dense metal powders to be used in a commercially viable production process.

According to a second embodiment of the present invention there is provided a process for the formation of pellets containing an ultra hard (superhard) core coated with an encapsulating material, the process including:
  suspending ultra hard core material in a flow of gas;
  contacting the ultra hard core material with encapsulating material to form pellets,
  providing a mixture comprising an appropriate binder, a solvent or fluid medium and the intended coating or encapsulating layer, combining the pellets and the mixture in a shovel rotor comprising a vessel including a rotor, the vessel adapted to receive a stream of gas to form encapsulated pellets, rotating the rotor at an appropriate velocity such that the pellets are encapsulated by the mixture.

The ultra hard material may be selected from cubic boron nitride and diamond (including natural and synthetic diamond, synthetic diamond including both High Pressure High Temperature (HPHT) and Chemical Vapour Deposition (CVD) synthetic diamond, and coated or cladded diamond).

The ultra hard core material is preferably suspended in a chamber or work vessel which may be a fluidised bed granulating/encapsulating apparatus. Preferably, the work vessel is a fluidised bed granulating/encapsulating apparatus of the type having a material work area, a rotatable perforated plate disposed immediately beneath the work area and means for conveying a gaseous fluid through the work area for fluidised circulation of charge material therewithin, the granulating apparatus being operated to generally individually fluidise the ultra hard core material within the work area.

The coating material may be comprised of metal powder, binder and solvent. The metal powder may be cobalt, copper, iron, bronze, tungsten carbide, nickel, tungsten metal, molybdenum, zinc, brass, silver, or a mixture of two or more thereof with a particle size preferably within the range of greater than approximately 0.1 micrometers and less than approximately 300 micrometers. Polyethylene glycol, liquid paraffin, glycerol, shellac, polyvinyl alcohol (PVA), polyvinyl butyral (PVB), cellulose or stearic acid, are preferred as the binder, and the solvent may be water or an organic solvent, preferably ethyl alcohol or trichloro-ethylene or IPA. The metal powder should comprise no greater than approximately 80%, preferably no greater than approximately 70%, preferably no greater than approximately 60%, preferably no greater than approximately 50%, by weight of the metal powder, binder and solvent mixture (slurry) and the binder should comprise no greater than approximately 30%, preferably no greater than approximately 25%, preferably no greater than approximately 20%, preferably no greater than approximately 15%, preferably no greater than approximately 10%, preferably no greater than approximately 5% of the weight of the metal powder.

In addition, a hard phase may be added to the metal powder to improve the wear resistance of the coating material itself. This hard phase could be diamond, cBN, tungsten carbide (WC), particles of WC-cobalt cermet or any conventional ceramic hard phase such as silicon carbide (SiC), silicon nitride (SiN), alumina (Al2O3) etc. or mixture of any of these. The size of these hard phases could range from 0.1 microns to 300 microns.

In the preferred embodiment of the present method, the spraying of the coating material is continued for a sufficient time to build the coating on each core to achieve a predetermined critical size (Vcrit). The average diametric dimension of each pellet may range up to, but no greater than, approximately 4, preferably no greater than 3, more preferably no greater than 2 times the average diametric dimension of the ultra hard cores. The perforated plate of the fluidised bed granulating apparatus is preferably rotated throughout the course of the granulating operation to circulate the ultra hard cores within the material work area during fluidisation of the cores.

The pellets are then combined with a mixture comprising an appropriate binder, a solvent or fluid medium and the intended coating or encapsulating layer, in a shovel rotor comprising a vessel including a rotor, the vessel adapted to receive a stream of gas to form encapsulated pellets.

The invention will now be described with reference to the following non-limiting examples.

EXAMPLE 1

The details of the diamond core and bond type are given:
Diamond Core: SDB1125 size 25/35 US Mesh, nominally 662 micron pre-coated with a titanium carbide layer.
Bond Material: WC/Co/Cu:65/25/10 by wt.
Bond density: 12.7 g/cc.
Slurry composition: 50% Bond powder by wt. in an ethyl alcohol solvent in which the binder material, in this case polyethylene glycol, has been added at a level of 3% of the wt. of the metal bond powder. In both methods this slurry formulation has been employed.

Stage 1

Trials on a shovel rotor with a nominal 360 mm diameter chamber were performed using V17-785 bond from Dr. Fritsch (approximately 65% WC, 5% Cu, 30% Co). The diamond used was coarse, high grade diamond pre-coated with a tungsten carbide layer of approximately 0.5 to 1.0 μm in thickness (Element Six's SDB1100+TC in 25/35 US mesh).

The dual process involved starting the pellet process in the shovel rotor apparatus with the formulation of binder and solvent detailed above, with the titanium carbide coated high quality diamond grit of US mesh size 2535 which is nominally 662 microns in diameter. The process was permitted to proceed until the diameter of the core crystals had increased to ~772 microns in diameter, composed of a "shell" of bond material. A sample of material was extracted and the particles were counted to establish the level of agglomeration (2 or more particles joined together). In addition, 100 particles were sampled and crushed to determine the percentage of pellets containing a single core only.

Stage 2

The entire batch from the initial shovel rotor stage was then transferred to the rotating pan apparatus and the process was restarted. Since the pellets have now attained a critical size prior to their introduction to the rotating pan, the propensity for agglomeration is significantly reduced. In addition, the surfaces of the pellets are now much more receptive to increased rates of bond deposition. The rate of increase in diameter of the pellet is proportional to the surface area and consequently the rate of accretion increases with increasing particle radius in a 2nd power relation i.e. ($r^2$) thus the deposition rate of the slurry containing the bond material in suspension could be increased with no significant increase in the level of agglomeration. Once again, the process was stopped and pellets sampled to determine the level of agglomeration and ensure the presence of one diamond core per pellet. The results of this analysis are presented in the Tables 1 and 2 below. In addition, the average deposition rates are presented for each technique in conjunction with the levels of agglomeration and "single core" estimates.

The benefits of the dual process technique are:
Stage 1) Shovel rotor method: ensures one core per pellet and allows low level agglomeration in the early stages of pellet build up thereby allowing a starting pellet size to be achieved with high level of single core pellets and low level of agglomerates.
Stage 2) Rotating pan method: allows rapid build up pellet to final size whilst the single core per pellet is retained and large pellet size is achievable since there is no dependence on maintaining a gaseous/fluid suspension which becomes difficult as pellet size/mass increases.

The dual process resulted in a minimised level of agglomeration combined with a significant improvement in single core containing pellets whilst allowing a maximum accretion rate compared to the other methods when employed in isolation.

TABLE 1

| Shovel Rotor Pellet Size (microns) | Shovel Rotor % agglom. | Roller Pan Coater Pellet Size (microns) | Roller Pan Coater % agglom. | Dual process Pellet Size (microns) | Dual process % agglom. |
|---|---|---|---|---|---|
| 662 | 0 | 662 | 0 | 762 | 1 |
| 712 | 1 | 737 | 5 | 962 | 2 |
| 762* | 1 | 812 | 8 | 1212 | 3 |
|  |  | 922 | 12 | 1562 | 4 |
|  |  | 1012 | 15 |  |  |
|  |  | 1187 | 20 |  |  |
|  |  | 1362 | 30 |  |  |
|  |  | 1562 | 35 |  |  |

(*transfer from shovel rotor to roller pan)

EXAMPLE 2

Two methods for pellet manufacture were employed in a dual stage approach:
1) Fluid bed; and
2) Shovel Rotor.

The details of the diamond core and bond type are given:
Diamond Core: SDB1125 size 2535# nominally 662 micron pre coated with a titanium carbide layer.
Bond Material: WC/Co/Cu:65/25/10 by wt.
Bond density: 12.7 g/cc.
Slurry composition: 50% Bond powder by wt. in an ethyl alcohol solvent in which the binder material, in this case polyethylene glycol, has been added at a level of 3% of the wt. of the metal bond powder. In both methods this slurry formulation has been employed.

Stage 1

The fluid bed apparatus is charged with 3000 crts. of diamond powder of size 2535#. The powder has already been pre-treated to ensure the presence of a titanium coating around each crystal. The graphs indicate the capability of each process individually to produce encapsulated diamond and the characteristics associated with production of pellets by each of these methods. The key factors are:
i) the level of agglomeration, and
ii) the percentage of pellets containing a single core particle.

The dual process maximises the population of pellets containing one single core whilst minimising the incidence of agglomerated pellets (i.e. two or more pellets joined together). It is then possible to achieve a rapid build up of the pellet without compromising on the agglomeration and single core population.

The dual process involved starting the pellet process in the fluid bed apparatus with the formulation of binder and solvent detailed above, with the titanium carbide coated high quality diamond grit of US mesh size 2535 which is nominally 662 microns in diameter. The process was permitted to proceed until the diameter of the core crystals had increased to ~772 microns in diameter, composed of a "shell" of bond material. A sample of material was extracted and the particles were counted to establish the level of agglomeration (2 or more particles joined together). In addition, 100 particles were sampled and crushed to determine the percentage of pellets containing a single core only.

Stage 2

The entire batch from the initial fluid bed was then transferred to the shovel rotor and the process was restarted. Since the pellets have now attained a critical size prior to their introduction to the rotating pan, the propensity for agglomeration is significantly reduced. In addition, the surfaces of the pellets are now much more receptive to increased rates of bond deposition. Once again, the process was stopped and pellets sampled to determine the level of agglomeration and ensure the presence of one diamond core per pellet.

The benefits of the dual process technique are that in Stage 1 (fluid bed method) ensures one core per pellet and allows low level agglomeration in the early stages of pellet build up thereby allowing a starting pellet size to be achieved with high level of single core pellets and low level of agglomerates.

The dual process resulted in a minimised level of agglomeration combined with a significant improvement in single core containing pellets whilst allowing a maximum accretion rate compared to the other methods when employed in isolation.

What is claimed is:

1. A process for the formation of pellets each containing a single superhard core coated with an encapsulating material, the process including the steps of:
    utilising a shovel rotor in combination with a rotating pan and/or a fluidised bed apparatus in sequence;
    providing a source of superhard cores;
    providing an encapsulating mixture comprising a binder, a solvent or fluid medium and a coating or encapsulating material;
    combining the superhard cores and the encapsulating mixture in a shovel rotor comprising a vessel including a rotor, the vessel adapted to receive a stream of gas;
    rotating the rotor at a velocity such that the superhard cores are encapsulated by the encapsulating mixture to form pellets, each pellet consisting of a single superhard core and the encapsulating mixture;
    introducing the pellets into a rotating vessel; and
    contacting the pellets with encapsulating mixture to form pellets of greater mass than the pellets introduced into the rotating vessel, each pellet consisting of a single superhard core and the encapsulating mixture,
    wherein the superhard cores are selected from the group consisting of diamond, cubic boron nitride, wurtzitic boron nitride, a carbide, oxide or silicide, $Si_3N_4$, SiC, $Al_2O_3$, AlC, $SiO_2$ and/or clusters of any thereof.

2. A process according to claim 1 wherein the rotating vessel is a pan or a drum.

3. A process according to claim 1 wherein the encapsulation of the cores in the shovel rotor is continued for a sufficient time to build the coating on each core to achieve a predetermined critical size (Vcrit).

4. A process according to claim 1 wherein the pellets produced in the shovel rotor are introduced into an inclined rotating pan, where the pellet is built further up by spraying a slurry containing metal powder, binder and solvent over the pellets and/or the binder and solvent are sprayed separately and the metal powder then sprinkled over the rotating pellets.

5. A process for the formation of pellets containing an superhard core coated with encapsulating material, the process including the steps of:
    i. suspending superhard core material in a flow of gas;

ii. providing an encapsulating mixture consisting of a binder, a solvent or fluid medium and a coating or encapsulating material,
iii. contacting the cores of superhard material with the encapsulating mixture to form pellets, each pellet consisting of a single core of superhard material and encapsulating mixture;
iv. combining the pellets and further encapsulating mixture in a shovel rotor comprising a vessel including a rotor, the vessel adapted to receive a stream of gas,
v. rotating the rotor at a velocity such that the pellets are encapsulated by the encapsulating mixture to form pellets of greater mass than the pellets introduced into the shovel rotor, each pellet consisting of a single core of superhard material and encapsulating mixture wherein the superhard material is selected from the group consisting of cubic boron nitride and diamond.

6. A process as claimed in claim 5 wherein the superhard core material is suspended in a chamber or work vessel which is a fluidised bed granulating/encapsulating apparatus.

7. A process according to claim 5 wherein the coating or encapsulating material is a metal powder, the metal powder being cobalt, copper, iron, bronze, tungsten carbide, nickel, tungsten metal, molybdenum, zinc, brass, silver, or a mixture of two or more thereof.

8. A process according to claim 7 wherein the metal powder comprises no greater than approximately 80% of the weight of the metal powder, binder and solvent mixture.

9. A process according to claim 7 wherein a hard phase is added to the metal powder encapsulating material encapsulating the single superhard core material, the hard phase selected from diamond, cBN, tungsten carbide (WC), particles of WC-cobalt cermet or any conventional ceramic hard phase including silicon carbide (SiC), silicon nitride (SiN), alumina (Al2O3) or mixture of any of these.

10. A process according to claim 5 wherein the binder is polyethylene glycol, liquid paraffin, glycerol, shellac, polyvinyl alcohol (PVA), polyvinyl butyral (PVB), cellulose, stearic acid or mixtures thereof.

11. A process according to claim 5 wherein the solvent is water or an organic solvent selected from ethyl alcohol, trichloro-ethylene and/or IPA.

* * * * *